United States Patent
Byczynski et al.

(10) Patent No.: US 8,901,930 B2
(45) Date of Patent: Dec. 2, 2014

(54) METHOD AND APPARATUS FOR A NON CONTACT METAL SENSING DEVICE

(75) Inventors: Glenn Byczynski, Windsor (CA); Robert Patrick, Tecumseh (CA); Christian Fruehauf, Saarlouis (DE)

(73) Assignee: Nemak Dillingen GmbH, Dillingen (DE)

( * ) Notice: Subject to any disclaimer, the term of this patent is extended or adjusted under 35 U.S.C. 154(b) by 530 days.

(21) Appl. No.: 13/096,326

(22) Filed: Apr. 28, 2011

(65) Prior Publication Data

US 2011/0273170 A1   Nov. 10, 2011

(30) Foreign Application Priority Data

Apr. 28, 2010 (EP) .................................. 10161298

(51) Int. Cl.
| | | |
|---|---|---|
| G01N 27/72 | (2006.01) | |
| G01N 27/74 | (2006.01) | |
| B22D 46/00 | (2006.01) | |
| B22D 33/04 | (2006.01) | |
| B22D 2/00 | (2006.01) | |
| B22D 37/00 | (2006.01) | |
| G01F 23/26 | (2006.01) | |
| B22D 11/18 | (2006.01) | |

(52) U.S. Cl.
CPC ............... *B22D 2/003* (2013.01); *B22D 37/00* (2013.01); *G01F 23/265* (2013.01); *B22D 11/186* (2013.01)
USPC ............ 324/323; 324/204; 164/457; 164/137

(58) Field of Classification Search
USPC ........................................................ 324/232
See application file for complete search history.

(56) References Cited

U.S. PATENT DOCUMENTS

| | | | | | |
|---|---|---|---|---|---|
| 1,096,229 | A | * | 5/1914 | Dodds | 324/227 |
| 1,910,770 | A | * | 5/1933 | Kinsley | 324/232 |
| 2,150,922 | A | * | 3/1939 | Hay | 324/232 |
| 2,690,537 | A | * | 9/1954 | Weiss et al. | 324/357 |
| 3,287,632 | A | * | 11/1966 | Tompkins | 324/226 |
| 3,697,972 | A | * | 10/1972 | Brown | 43/59 |
| 3,876,932 | A | * | 4/1975 | Domon et al. | 361/143 |
| 3,943,992 | A | * | 3/1976 | Mezger | 164/156.1 |

(Continued)

FOREIGN PATENT DOCUMENTS

| | | |
|---|---|---|
| EP | 0223874 A1 | 6/1987 |
| JP | 3105219 A | 5/1991 |

(Continued)

OTHER PUBLICATIONS

Foley, Brian M., "A System for Detecting the Position of a Molten Aluminum Metal-Front within a Precision Sand Mold", Presented on Dec. 15, 2008, Worcester Polytechnic Institute, Worcester, Massachusetts.

*Primary Examiner* — Jermele M Hollington
*Assistant Examiner* — Christopher McAndrew
(74) *Attorney, Agent, or Firm* — The Webb Law Firm (57) ABSTRACT

A method for detecting metal in an inner region of a caster mold during a casting process using a plurality of eddy current probe assemblies, wherein each of the plurality of eddy current probe assemblies is configured to generate a primary magnetic field passing through nonconductive mold material of the casting mold to the inner region of the casting mold and to provide a signal indicative of a detected secondary magnetic field caused by eddy currents induced in the metal.

11 Claims, 7 Drawing Sheets

(56) References Cited

U.S. PATENT DOCUMENTS

| | | | | |
|---|---|---|---|---|
| 4,144,756 A | * | 3/1979 | Linder | 73/290 R |
| 4,563,644 A | * | 1/1986 | Lenander et al. | 324/232 |
| 4,635,832 A | * | 1/1987 | Angerer et al. | 222/590 |
| 4,714,102 A | * | 12/1987 | Koya | 164/457 |
| 4,816,758 A | * | 3/1989 | Theissen et al. | 324/204 |
| 4,818,936 A | * | 4/1989 | Kemlo | 324/232 |
| 4,837,510 A | * | 6/1989 | Tornblom | 324/225 |
| 4,893,507 A | * | 1/1990 | Ciani | 73/290 R |
| 5,409,054 A | * | 4/1995 | Moriceau | 164/453 |
| 5,729,129 A | * | 3/1998 | Acker | 324/207.12 |
| 6,311,759 B1 | * | 11/2001 | Tausig et al. | 164/113 |
| 6,538,435 B2 | * | 3/2003 | Crouzen et al. | 324/232 |
| 7,259,555 B2 | * | 8/2007 | Nummila et al. | 324/209 |
| 7,423,423 B2 | * | 9/2008 | Becker et al. | 324/232 |
| 7,658,291 B2 | * | 2/2010 | Valerio | 209/559 |
| 8,167,024 B2 | * | 5/2012 | Kunstreich | 164/468 |
| 2002/0185250 A1 | * | 12/2002 | Shade | 164/137 |
| 2006/0011322 A1 | * | 1/2006 | Dussud et al. | 164/457 |
| 2009/0090482 A1 | * | 4/2009 | Foley et al. | 164/457 |
| 2009/0269239 A1 | * | 10/2009 | Nagakura et al. | 420/542 |
| 2012/0048011 A1 | * | 3/2012 | Dussud | 73/304 R |

FOREIGN PATENT DOCUMENTS

| | | |
|---|---|---|
| JP | 4238661 A | 8/1992 |
| JP | 6137921 A | 5/1994 |
| JP | 11304566 A | 11/1999 |

* cited by examiner

METHOD AND APPARATUS FOR A NON CONTACT METAL SENSING DEVICE

This invention relates to detecting metal in a casting mould based on at least one eddy current probe assembly.

The casting of metal objects involves the introduction of liquid metal into a mould. The manner of which the metal is introduced can be widely classified into gravity and counter gravity casting methods. The nature of these methods as well as the filling orientation, the shape of mould cavity and geometry of the gating all influence the path and flow of the liquid metal. It has been shown that uncontrolled and turbulent metal flow can lead to many types of defects in aluminium and other metals.

In counter gravity systems it is often beneficial to measure the filling rate at different points or continuously during mould filling in order to provide the possibility for real time adjustments of the metal fill rate.

One prior art approach for measuring the filling rate during mould filling is based on metal probes that are arranged to physically contact the liquid metal. For instance, an electric circuit may be closed when the contact probes come into contact with the liquid metal.

This solution has the disadvantage that it can be only easily implemented into open moulds, but if used on closed moulds the metal probes must seal against metal leakage and must be able to retract.

Further disadvantages arise due to the physical contact between the metal probe and the liquid metal. As an example, metal probe contact with hot liquid metal, sand and binder results in build-up material and binder combustion by products. Metal probes therefore must be cleaned or replaced periodically leading to increased maintenance activities and costs.

If the approach for measuring the filling rate by means of metal probes is based on closing an electrical circuit several aspects like electrical insulation of mould and filling equipment and electrical grounding of sensor must be taken into account.

A further prior art approach for measuring the filling rate during mould filling is based on sensors that operate on the principle of capacitance or inductance for detecting changes in the proximity of the molten metal to the sensor.

This solution has the disadvantage that it requires expensive and sophisticated equipment and that the sensor must be in contact with the mould. This contact with the mould increases the risk of preserving the integrity of the sensor and quality of the feedback signal. The necessity of replacing damaged sensors increases maintenance costs.

Furthermore, the sensor needs to be calibrated before each casting is made, thereby slowing down the manufacturing process.

In the specific case of the casting cylinder blocks using liquid aluminium in sand moulds, the response signal is non linear in nature and is strongly influenced when the liquid metal contacts other materials, e.g., gray iron cylinder bore liners or metallic chilling elements. The resulting interference with the signal makes interpretation extremely difficult.

In view of these prior art approaches it was the object of the present invention to provide an apparatus, a system and a method for enabling contactless detection of metal with enhanced reliability.

A method for detecting metal in an inner area of a casting mould during a casting process is described, wherein one or more eddy current probe assemblies are positioned outside the inner area of the casting mould, the method comprising exciting at least one eddy current probe assembly of the one or more eddy current probes such that each of the at least one eddy current probe assembly generates a primary magnetic field passing through non-conductive mould material of the casting mould to the inner area of the casting mould, providing at each of the at least one eddy current probe assemblies a signal indicative of a secondary magnetic field detected by the respective eddy current probe assembly, the secondary magnetic field caused by eddy currents induced in metal in the inner area, and detecting metal in the casting mould based on said at least one signal.

Moreover, a system for detecting metal in an inner area of a casting mould during a casting process is described, the system comprising one or more eddy current probe assemblies positioned outside the inner area of the casting mould such that each of the one or more eddy current probe assemblies is configured to generate a primary magnetic field passing through non-conductive mould material of the casting mould to the inner area of the casting mould and to provide a signal indicative of a detected secondary magnetic field caused by eddy currents induced in metal in the inner area, and the system comprising a controller configured to excite at least one eddy current probe assembly of the one or more eddy current probes such that each of the at least one eddy current probe assemblies generates the primary magnetic field, and to detect metal in the casting mould based on the at least one signal provided by the at least one eddy current probe assembly.

Moreover, the use of one or more eddy current probe assemblies for detecting metal in an inner area of a casting mould during a casting process is described, wherein each of the one or more eddy current probe assemblies is configured to generate a primary magnetic field passing through non-conductive mould material of the casting mould to the inner area of the casting mould and to provide a signal indicative of a detected secondary magnetic field caused by eddy currents induced in metal.

An eddy current probe assembly may comprise at least one exciting coil for generating a primary magnetic field by supplying an alternating current to drive the at least one exciting coil. The eddy current probe assembly may further comprise a detection element which is configured to detect eddy current fields generated on the surface of a conductive component by detecting a secondary magnetic field generated by said induced eddy current fields. For instance, the detection element may comprise at least one coil, and/or at least one superconducting quantum interference detector, and/or at least one solid-state magnetic sensor (e.g., Hall effect, magneto resistive, and spin-dependent tunnelling sensors). The term "magnetic field" has to be understood in the sense that an electromagnetic field also represents a magnetic field. The eddy current probe assemblies may be standard manufactured items and may not require custom manufacture.

Each of the plurality of eddy current probe assemblies may be arranged at a predefined position with respect to the casting mould so as to detect liquid metal in a predefined region of the casting mould by means of generating a primary magnetic field passing through a non-conductive mould material in the respective predefined region of the casting mould and providing a signal indicative of a detected secondary magnetic field caused by eddy current induction in liquid metal in the respective region. Accordingly, the signal provided by one eddy current probe assembly of the plurality of eddy current probe assemblies can be used to detect metal in the predefined region associated with this eddy current probe assembly. As an example, for each of the predefined regions associated with one of the one or more eddy current probe assemblies liquid metal may be detected when liquid metal in the casting mould reaches the respective predefined region during a casting process.

The one or more eddy current probe assemblies are positioned outside the inner area of the casting mould and each of the one or more eddy current probe assemblies is configured to generate a primary magnetic field passing through non-conductive mould material of the casting mould to the inner area of the casting mould. The term "non-conductive mould material" has to be understood in the sense that this material does not totally shield the magnetic field generated by the respective eddy current probe assembly. Thus, the non-conductive material of the casting mould is configured to let pass the primary magnetic field at least partially into the inner area of the casting mould. For instance, the casting mould may consist of non-conductive mould material in its entirety, or the casting mould may comprise non-conductive mould material at least at locations where an eddy current probe assembly is positioned. As an example, the non-conductive mould material may represent sand, e.g., like silica sand core, and, for instance, the casting mould may represent a sand casting mould. Any other well-suited materials may also be used for forming the non-conductive mould material.

The casting mould may be configured to be filled with liquid metal based on a counter gravity method. During the casting the level of liquid metal in the inner area of the casting mould will increase.

Positioning the one or more eddy current probe assemblies outside the inner area of the casting mould has the advantage that each eddy current probe assembly of the one or more eddy current probe assemblies is not in contact with the liquid metal due to non-conductive mould material placed between the eddy current probe assembly and liquid metal, when the level of liquid metal reaches the height of the eddy current probe assembly during casting. This leads to reduced maintenance costs and preserves the integrity of the one or more eddy current probe assemblies and quality of the signals provided by the one or more eddy current probe assemblies.

Thus, the present invention allows detecting metal in a casting mould based on a method, or an apparatus or a system enabling non contact metal sensing. Furthermore, the use of one or more eddy current probe assemblies for detecting metal has the advantage of strong and distinct detection of a secondary magnetic field generated by eddy currents is a strong and distinct.

Each of the one or more eddy current probe assemblies may be configured to provide the respective signal indicative a detected secondary magnetic field at an interface. This interface may represent a wired interface, i.e., the interface may be configured to be connected with a cable, or the interface may represent wireless interface. The interface may be used for exciting the eddy current probe assembly so as to generate the primary magnetic field. In case the interface represents a wired interface, an alternating current with a predefined frequency and amplitude may be provided to the interface so as to excite the eddy current probe assembly. In case the interface represents a wireless interface, the eddy current probe assembly may comprise an own alternating current generating means.

The controller may be configured to be connected with each of the one or more eddy current probe assemblies via the respective interface of each of the one or more eddy current probe assemblies.

Based on the at least one signal provided by the at least one eddy current probe assembly metal can be detected in the casting mould. For instance, detecting metal may comprise estimating the filling rate and/or estimating the level of liquid metal in the casting mould based on the at least one signal.

In one embodiment of the present invention, at least one of the one or more eddy current probe assemblies is configured to set the respective signal to a first representation in case no secondary magnetic field is detected at the respective eddy current probe assembly and to set the respective signal to a second representation in case a secondary magnetic field is detected at the respective eddy current probe assembly.

For instance, an eddy current probe assembly may be configured to set the signal to the second representation in case a received secondary magnetic field exceeds a predefined threshold, otherwise the signal is set to the first representation by the eddy current probe assembly. The threshold, the intensity and frequency of the primary magnetic field and the arrangement of the eddy current probe assembly with respect to the casting mould may be chosen in a manner that the eddy current probe assembly is configured to set the signal to the second representation when the liquid metal reaches a predefined level in the casting mould.

As an example, this information may be used to proceed with filling liquid metal into the casting mould until the signal indicative of a secondary magnetic field provided by a predefined eddy current probe assembly of the one or more eddy current probe assemblies is in the second representation.

In one embodiment of the present invention, at least one of the one or more eddy current probe assemblies is configured to provide the respective signal in a representation indicative of the intensity of the secondary magnetic field detected at the respective eddy current probe assembly.

For instance, the signal indicative of the intensity of the secondary magnetic field provided by an eddy current probe assembly may be used for continuously estimating the level of liquid metal and/or for continuously estimating the filling rate of liquid metal during mould filling.

In one embodiment of the present invention, the one or more eddy current probe assemblies are a plurality of eddy current probe assemblies, wherein each of the plurality of eddy current probe assemblies is arranged at a predefined position with respect to the respective non-conductive mould material of the casting mould so as to detect metal in a predefined region of the casting mould.

Accordingly, the signal provided by one eddy current probe assembly of the plurality of eddy current probe assemblies may be used to detect metal in the predefined region associated with this eddy current probe assembly. For instance, for each of the predefined regions associated with one of the plurality of eddy current probe assemblies liquid metal may be detected when liquid metal in the casting mould reaches the respective predefined region during a casting process.

For instance, in case one or more of the plurality of eddy current probe assemblies are configured to provide the respective signal in a representation indicative of the intensity of the secondary magnetic field detected at the respective eddy current probe assembly, detection of metal may comprise estimating the level of liquid metal and/or estimating the filling rate of liquid metal in one of the predefined regions associated with one of the one or more eddy current probe assemblies based on the respective signal indicative of the intensity of the secondary magnetic field detected in the respective predefined region. This estimating may represent a continuously estimating of the level and/or filling of liquid metal, since the intensity indicated by the signal of an eddy current probe associated with a respective predefined region is a function of the level of liquid metal in the predefined region. Estimating the filling rate in a predefined region may be performed based on the rise of the indicated intensity of the detected secondary magnetic field.

Furthermore, in case one or more of the plurality of eddy current probe assemblies are configured to set the respective signal to the first or second representation, detection of metal may comprise estimating the level of liquid metal at different points in the casting point, wherein each of these different points is associated with one predefined region of a respective eddy current probe assembly. For instance, a filling rate may be estimated based on measuring a first time when the liquid metal reaches a first predefined region and measuring a second time when the liquid metal reaches a second predefined region and based on the cavity to be filled with liquid metal in the casting mould between the first and second predefined region.

In one embodiment of the present invention, the metal represents liquid metal and the method comprises adjusting the filling rate of the liquid metal based on detected metal in the casting mould.

Adjusting the filling rate of the liquid metal based on detected metal in the casting mould has to be understood in the sense that the filling rate is adjusted based on the at least one signal provided by the at least one eddy current probe assembly, since each of this at least one signal is indicative of a secondary magnetic field detected by the respective eddy current probe assembly and thus is indicative of detected metal in a respective predefined region in the casting mould associated with this eddy current probe assembly.

The system comprises means for providing liquid metal to the casting mould, wherein the means for providing liquid metal may comprise an outlet arranged at a lower position in the casting mould so as to provide liquid metal in accordance with a counter gravity filling method. The system further comprises means for flow control of liquid metal, wherein this means for flow control are arranged at the means for providing liquid metal and are configured to control flow of liquid metal through the means for means for providing liquid metal. For instance, the means for flow control may represent a valve.

The means for flow control are connected with the controller. The controller is configured to control the means for flow control based on the at least one signal provided by the at least one eddy current probe assembly in order to adjust the filling rate of the liquid metal.

Adjusting the filling rate may comprise adjusting the rate of flow of liquid metal through the means for providing liquid metal, e.g. in accordance with discrete rates of flow or in accordance with continuously adapted rates of flow, and/or it may comprise closing the means of flow control in order to stop filling the casting mould. The second alternative has to be understood that the filling rate is set to zero.

For instance, detecting liquid metal may comprise estimating the filling rate of liquid metal and/or estimating the level of liquid metal in the casting mould, as explained above. Thus, for instance, the filling rate of the liquid metal may be adjusted based on the estimated filling rate and/or the estimated level of liquid metal.

Accordingly, this has the advantage that the filling rate of the mould can be adjusted in real time by means of the controller which is configured to receive the at least one signal, to detect liquid metal and to control the means for flow control in accordance with the detected liquid metal.

In one embodiment of the present invention, adjusting the filling rate comprises stop filling the casting mould when metal is detected based on the signal of a predefined eddy current probe assembly.

For instance, this predefined eddy current probe assembly may represent the sole eddy current probe assembly used for detecting metal. This predefined eddy current probe assembly may be arranged at a position so as to detect liquid metal in a predefined region of the casting mould, wherein filling of liquid metal has to be stopped when liquid metal reaches this predefined region. Accordingly, based on the signal indicative of a detected secondary magnetic field in this predefined region, filling the casting mould can be stopped when metal is detected based on this signal. Thus, this eddy current probe assembly can be used for providing feedback to signal "mould full". Furthermore, the predefined eddy current probe assembly may represent one of a plurality of eddy current probe assemblies. For instance, the remaining eddy current probe assemblies may be used for adjusting the filling rate before the liquid metal reaches the predefined region of the predefined eddy current probe assembly.

In one embodiment of the present invention, adjusting the filling rate comprises adjusting the filling rate in accordance with a filling rate value associated with a predefined eddy current probe assembly when metal is newly detected based on the signal of this predefined eddy current probe assembly.

For instance, each of the predefined regions of one of the one or more eddy current probe assemblies may be associated with a respective filling rate value of liquid metal. Upon detection newly detection of metal based on the signal of an eddy current probe assembly, the controller may be configured to adjust the rate of flow of liquid metal in accordance with the filling rate value associated with this eddy current probe assembly and thus associated with the respective predefined region. The term "newly detected" may be understood in sense that a signal indicative of a detected secondary magnetic field in a predefined region changes from indicating that no metal is detected to indicating that metal is detected. For instance, in case an eddy current probe assembly is configured to set the signal to the first or second representation, metal is newly detected based on the signal of this eddy current probe assembly when this signal changes from the first representation to the second representation.

Or, for instance, in case an respective eddy current probe assembly is configured to provide the signal in a representation indicative of the intensity of the secondary magnetic field, metal is newly detected based on the signal of this eddy current probe assembly in case the intensity indicated by this signal changes from a intensity less a predefined intensity threshold to an intensity greater than this predefined intensity threshold. This threshold may be chosen in accordance with a predefined level of liquid metal with respect to the predefined region associated with this eddy current probe assembly. Furthermore, as another example, the filling rate of liquid metal may be continuously adjusted based on the intensity of the detected secondary magnetic field.

Accordingly, adjusting the filling rate can be performed with respect to several predefined regions in the casting mould, thereby enhancing the quality of casting process due to the possibility of adapted filling rates in accordance with the requirements of special regions in the casting mould.

In one embodiment of the present invention, at least one of the one or more eddy current probe assemblies is arranged at a predefined distance to the respective non-conductive mould material.

Placing a eddy current probe assembly at a predefined distance near the non-conductive mould material has the advantage of reducing the risk of damage caused by heat of the non-conductive mould material during the casting process due to an air gap formed between the eddy current probe assembly and the non-conductive mould material. The precise distance is dependent on the thickness of the non-conductive mould material but may be compensated by the intensity and frequency of the primary magnetic field.

In one embodiment of the present invention, at least one of the one or more eddy current probe assemblies is contact with the respective mould non-conductive mould material.

Placing an eddy current probe assembly in contact with the non-conductive mould material has the advantage that the intensity and/or frequency of the primary magnetic field for penetrating the non-conductive mould material can be reduced compared to a placement of the eddy current probe assembly at a predefined distance near the non-conductive mould material.

The features of the present invention and of its exemplary embodiments as presented above shall also be understood to be disclosed in all possible combinations with each other.

It is to be noted that the above description of embodiments of the present invention is to be understood to be merely exemplary and non-limiting.

Further aspects of the invention will be apparent from and elucidated with reference to the detailed description presented hereinafter.

Figure 1A:
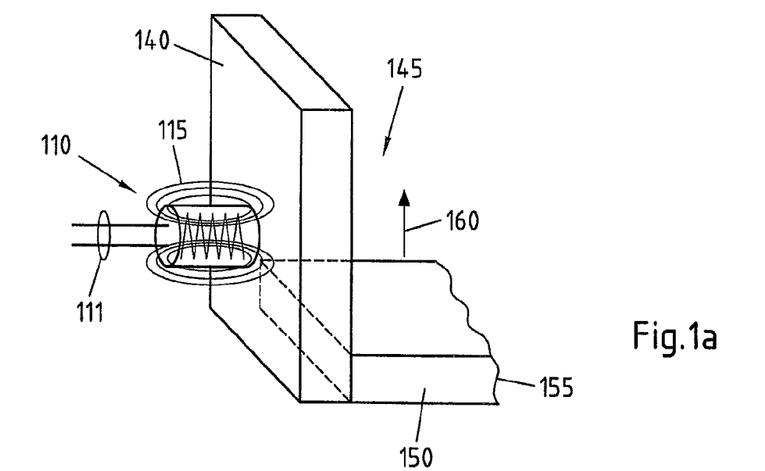
FIG. 1a depicts a first exemplary embodiment of use of an eddy current probe assembly according to the present invention in a first scenario.
Figure 1B:
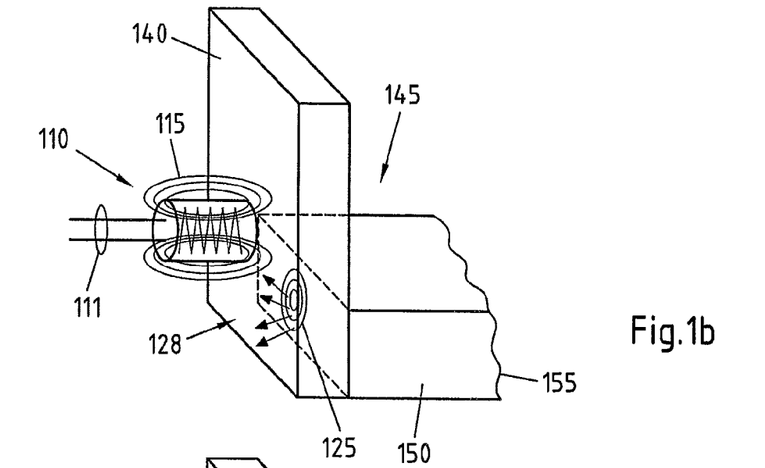
FIG. 1b depicts the first exemplary embodiment of use of an eddy current probe assembly according to the present invention in a second scenario.
Figure 1C:
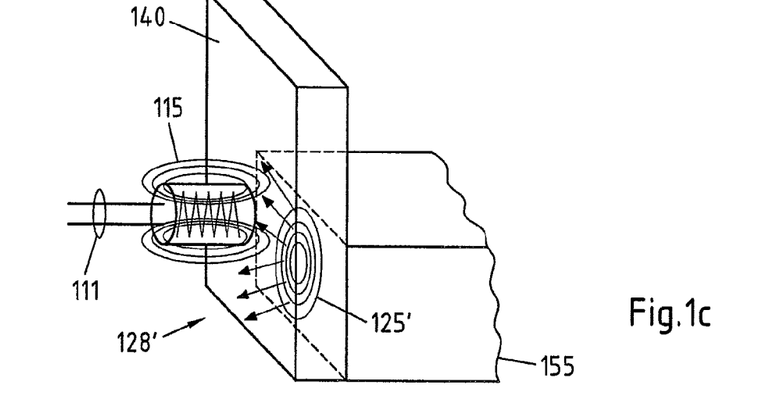
FIG. 1c depicts the first exemplary embodiment of use of an eddy current probe assembly according to the present invention in a third scenario.

FIG. 1a to 1c depict a first exemplary embodiment of use of an eddy current probe assembly 110 according to the present invention in a first scenario in a first scenario, a second scenario and a third scenario, respectively. This first exemplary embodiment of use of an eddy current probe assembly 110 according to the present invention will be explained in conjunction with the first exemplary method according to the present invention depicted in FIG. 2.

The eddy current probe assembly 110 is used for detecting liquid metal 150 through non-conductive mould material 140 representing a part of a casting mould. The casting mould is not depicted in its entirety, as indicated by cutting line 155. The casting mould may be configured to be filled with liquid metal 150 based on a counter gravity method. During the casting the level of liquid metal 150 in an inner area 145 of the casting mould will increase, as indicated by arrow 160 in FIG. 1a.

The eddy current probe assembly 110 is configured to generate a primary magnetic field 115 passing through non-conductive mould material 140 of the casting mould to the inner region 145 of the casting mould and to provide a signal indicative of a detected secondary magnetic field 128 caused by eddy currents 125 induced in the liquid metal 150. The term "magnetic field" has to be understood in the sense that an electromagnetic field also represents a magnetic field.

The eddy current probe assembly 110 may be configured to provide this signal indicative of a detected secondary magnetic field at an interface 111. This interface 111 may represent a wired interface, i.e., the interface may be configured to be connected with a cable, or the interface 111 may represent wireless interface. The interface 111 may be used for exciting the eddy current probe assembly so as to generate the primary magnetic field 115. In case the interface 111 represents a wired interface, an alternating current with a predefined frequency and amplitude may be provided to the interface 111 so as to excite the eddy current probe assembly 110. In case the interface 111 represents a wireless interface, the eddy current probe assembly 110 may comprise an own alternating current generating means.

The eddy current probe assembly may 110 be placed near the non-conductive mould material 140 at a predefined distance or it may be placed in contact with the non-conductive mould material 140. In both cases the primary magnetic field 115 generated by the eddy current assembly 110 must be of significant strength and frequency as to penetrate the non-conductive mould material 140.

Placing the eddy current probe assembly 110 at a predefined distance near the non-conductive mould material 140 may show the advantage of reducing the risk of damage caused by heat of the non-conductive mould material 140 during the casting process due to an air gap formed between the eddy current probe assembly 110 and the non-conductive mould material. The precise distance is dependent on the thickness of the non-conductive mould material 140 but may be compensated by the intensity and frequency of the primary magnetic field 115.

Placing the eddy current probe assembly 110 in contact with the non-conductive mould material 140 may show the advantage that the intensity and/or frequency of the primary magnetic field for penetrating the non-conductive mould material 140 can be reduced compared to a placement of the eddy current probe assembly 110 at a predefined distance near the non-conductive mould material 140.

Figure 2:
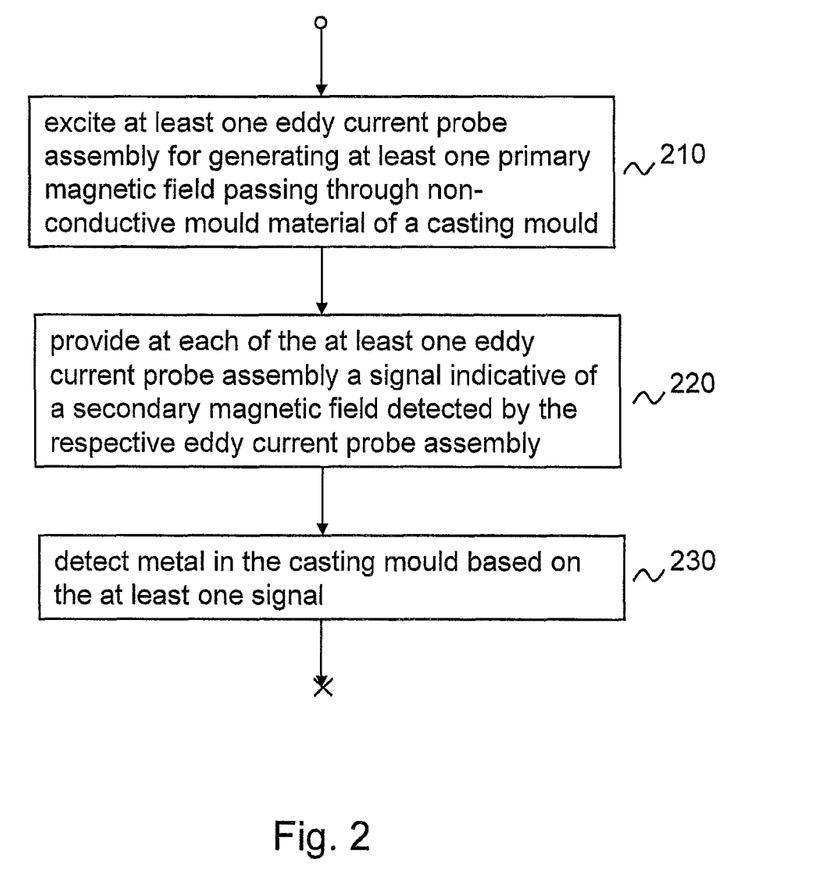
FIG. 2 depicts a flowchart of a first exemplary method according to the present invention.

In accordance with step 210 of the exemplary method illustrated in FIG. 2, the eddy current probe assembly 110 is excited so as to generate a primary magnetic field 115 passing through the non-conductive mould material 140. In the first scenario depicted in FIG. 1a, the level of the liquid metal 150 is low compared to the position of the eddy current assembly 110, i.e., the primary magnetic field 115 does not induce detectable eddy currents in the liquid metal 150.

Accordingly, no secondary magnetic field is generated by an eddy current induced in the liquid metal 150 and the eddy current probe assembly 110 fails to detect a secondary magnetic field. Thus, in accordance with step 220 of the exemplary method, the signal indicative of a secondary magnetic field provided at signal line 111 indicates that no secondary magnetic field is detected by the eddy current probe assembly 110. Accordingly, no metal is detected in step 230 since the signal indicates that no secondary magnetic field is detected by the eddy current probe assembly 110 with respect to the first scenario depicted in FIG. 1a.

With respect to the second scenario depicted in FIG. 1b, the level of liquid metal 150 is increased compared to the level shown in the first scenario. The eddy current probe assembly 110 is excited so as to generate a primary magnetic field 115 passing through the non-conductive mould material 140. Due to the increased level of liquid metal the primary magnetic field 115 induces minor eddy currents 125 in the surface of the liquid metal 150 facing the non-conductive mould material 140. These minor eddy currents 125 generate a secondary magnetic field 128 having low intensity, as shown in FIG. 1b, and which may pass through the non-conductive mould material 140 to the eddy current probe assembly 110. The eddy current probe assembly 110 is configured to receive this secondary magnetic field 128 and to provide the signal indicative of a detected secondary magnetic field. The term "detected secondary magnetic field" may be understood in a manner that a very small secondary magnetic field 128 received by the eddy current probe assembly 110 may not necessarily represent a detected secondary magnetic field.

In a first exemplary embodiment of the eddy current probe assembly 110, the signal indicative of a detected secondary magnetic field 128 indicates in a first representation that no secondary magnetic field is detected and indicates in a second representation that a secondary magnetic field is detected. For instance, the eddy current probe assembly 110 may be configured to set the signal to the second representation in case a received secondary magnetic field exceeds a predefined threshold, otherwise the signal is set to the first representation by the eddy current probe assembly 110. The threshold, the intensity and frequency of the primary magnetic field and the placement of the eddy current probe assembly 110 with respect to the non-conductive mould material 140 may be chosen in a manner that the eddy current probe assembly 110 is configured to set the signal to the second representation when the liquid metal 160 reaches a predefined level in the casting mould. As an example, with respect to the second scenario depicted in FIG. 1b and with respect to this first exemplary embodiment of the eddy current probe assembly 110, in step 220 depicted in FIG. 2 the eddy current probe assembly 110 may set the signal in the first representation, since the intensity of the secondary magnetic field 128 is detected to be less than or equal to the predefined threshold. Thus, based on the signal provided from the eddy current probe assembly 110 in accordance with the second scenario depicted in FIG. 1b, no metal is detected in step 230 of the method illustrated in FIG. 2. For instance, this information may be used to proceed with filling liquid metal 150 into the casting mould until the signal indicative of a secondary magnetic field provided by the eddy current probe assembly 110 is in the second representation.

In a second exemplary embodiment of the eddy current probe assembly 110, the signal indicative of a detected secondary magnetic field may be indicative of the intensity of the detected secondary magnetic field. Thus, with respect to the second scenario depicted in FIG. 1b and with respect to this second exemplary embodiment of the eddy current probe assembly 110, in step 220 depicted in FIG. 2, the eddy current probe assembly 110 may provide a signal indicative of a secondary magnetic field 128 having low intensity. For instance, the eddy current probe assembly 110 according to the second exemplary embodiment configured to provide the signal indicative of the intensity of the detected secondary magnetic field may be used for determining whether the level of the liquid metal 150 reaches a predefined level in the casting mould during step 230. Metal 150 may be detected in accordance with step 230 in case the intensity indicated by the signal exceeds a predefined threshold. Furthermore, the step of detecting metal 230 based on the signal may comprise determining the level of the liquid metal 150, even if only one eddy current assembly probe 110 according to the second exemplary embodiment is used for detecting metal 150.

With respect to the third scenario depicted in FIG. 1c, the level of liquid metal 150 is increased compared to the level shown in the second scenario such that the primary magnetic field 115 of the eddy current probe assembly 110 induces stronger eddy currents 125' in the surface of the liquid metal facing compared to the eddy currents 125 induced in the second scenario. Accordingly, these stronger eddy currents 125' generate a secondary magnetic field 128' having higher intensity.

For instance, regarding the first exemplary embodiment of the eddy current probe assembly 110, the received secondary magnetic field 128' may exceed the predefined threshold and eddy current probe assembly 110 provides the signal in the second representation.

The use of the eddy current probe assembly 110 as depicted in FIGS. 1a to 1c shows the further advantage that the eddy current probe assembly 110 is not in contact with the liquid metal 150 due to non-conductive mould material 140 placed between the eddy current probe assembly 110 and the liquid metal 150, thereby reducing maintenance costs and preserving the integrity of the eddy current probe assembly 110 and quality of the signal provided at interface 111.

Figure 3A:
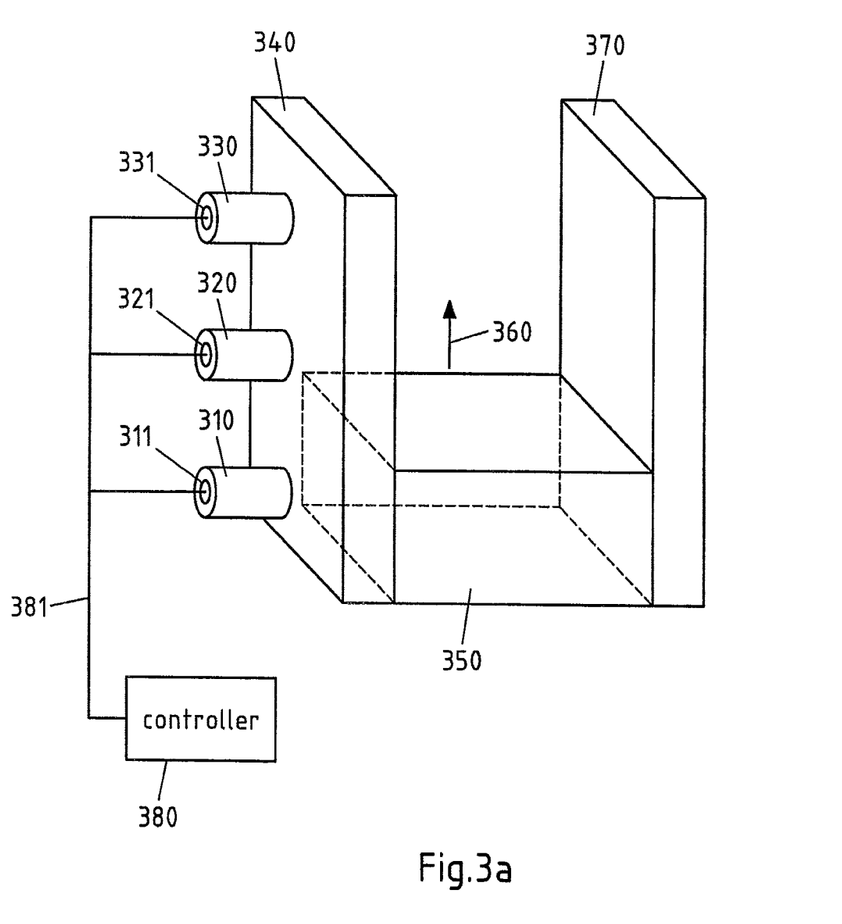
FIG. 3a depicts a first exemplary embodiment of a system according to the present invention.

FIG. 3a depicts a first exemplary embodiment of a system according to the present invention. This system comprises a plurality of eddy current probe assemblies 310, 320, 330 arranged at predefined positions with respect to the casting mould. Each of the eddy current probe assemblies 310, 320, 330 may be realized by the eddy current probe assembly 110 presented with respect to the FIGS. 1a to 1c.

The eddy current probe assemblies 310, 320, 330 are connected with a controller 380 via respective interfaces 331, 332, 333 and a signal line 381. The controller 380 is configured to excite the eddy current probe assemblies 310, 320, 330 for generating a primary magnetic field (not depicted in FIG. 3a) by the respective eddy current probe assembly 310, 320, 330. The term "exciting" has to be understood in the sense that the alternating current source may be placed separate from the controller 380, but the controller 380' is configured to control exciting the respective eddy current probe assembly 310, 320, 330 so as to generate the primary magnetic field, e.g., by means of controlling an alternating current source.

Furthermore, the controller 380 may be configured to receive the signal indicative of a detected secondary magnetic field provided by one of the eddy current probe assemblies 310, 320, 330.

Each of the plurality of eddy current probe assemblies 310, 320, 330 may be arranged at a predefined position so as to detect liquid metal 350 in a predefined region of the casting mould by means of generating a primary magnetic field passing through a non-conductive mould material 340 in the respective predefined region of the casting mould and providing a signal indicative of a detected secondary magnetic field caused by eddy current induction in liquid metal 350 in the respective region. Accordingly, the signal provided by one eddy current probe assembly of the plurality of eddy current probe assemblies 310, 320, 330 can be used to detect metal in the predefined region associated with this eddy current probe assembly. For instance, for each of the predefined regions associated with one of the plurality of eddy current probe assemblies 310, 320, 330 liquid metal 350 may be detected when liquid metal 350 in the casting mould reaches the respective predefined region during a casting process. Arrow 360 indicates that the level of liquid metal 350 rises during the casting process.

As an example, the controller 380 may be configured to excite the eddy current probes 310, 320, 330 in accordance with a predefined rule. For instance, this predefined rule may comprise the rule that two neighbored eddy current probe assemblies 310, 320 (or 320, 330) are not excited at the same time. The term "neighbored" may be understood in the manner that the primary magnetic field of one of two neighbored eddy current probe assemblies would interfere with or would influence the secondary magnetic field detected by the remaining eddy current probe assembly of the two neighbored eddy current probe assemblies. This has the advantage that magnetic fields of two neighbored eddy current probes do not interfere with each other. Furthermore, as another example, the predefined rule may comprise the rule that at least two eddy current probes of the plurality of eddy current probe assemblies 310, 320, 330 are sequentially excited in a predefined order. This has the advantage that these at least two eddy current probe assemblies do not interfere with each other.

For example, in case the eddy current probe assemblies 310, 320, 330 are realized by means of the first exemplary embodiment of eddy current probe assemblies, the signal provided by one eddy current probe assembly of the eddy current probe assemblies 310, 320, 330 may be used for determining whether the level of liquid metal has reached the respective predefined region, i.e., by determining whether this signal is in the first representation or the second representation, wherein the second representation indicates detection of metal in the respective predefined region. For instance, this information may be used for controlling the filling of the casting mould, as will be described later with respect to the second exemplary embodiment of a system according to the present invention shown in FIG. 3*b*.

As exemplarily depicted in FIG. 3*a*, the eddy current probe assemblies 310, 320, 330 may be positioned at separate heights with respect to the casting mould, and, thus, each of the predefined regions associated with a respective eddy current probe assembly 310, 320, 330 may be associated with a separate height. This has the advantage that the level of liquid metal 350 in the casting mould can be estimated based on at least one of the signals provided by these eddy current probe assemblies 310, 320, 330. Estimation of the level of the liquid metal 350 may be performed by controller 380 based on at least one signal received from at least one eddy current probe assembly 310, 320, 330 of the plurality of eddy current probe assemblies 310, 320, 330.

For instance, in case the eddy current probe assemblies 310, 320, 330 are realized by means of the first exemplary embodiment of eddy current probe assemblies, a signal of one of the plurality of eddy current probe assemblies 310, 320, 330 being in the second representation indicates that the level of liquid metal 350 has reached the predefined region of this eddy current probe assembly and thus has approximately reached the height of this eddy current probe assembly.

Furthermore, as another example, in case the eddy current probe assemblies 310, 320, 330 are realized by means of the second exemplary embodiment of eddy current probe assemblies, the signals provided by these eddy current probe assemblies 310, 320, 330 may be used for estimating the level of liquid metal 350 in the casting mould in a more precisely way compared to the usage of eddy current probe assemblies of the first exemplary embodiment, since a signal provided by one of the plurality of eddy current probe assemblies 310, 320, 330 indicative of the intensity of the detected secondary magnetic field can be used to estimate the level of the liquid metal 350 in the respective predefined region based on the intensity of the detected secondary magnetic field. For instance, the estimated level of liquid metal 350 in the respective predefined region may be a function of the intensity of the detected secondary magnetic field, wherein a lower intensity corresponds to a lower level of liquid metal 350 and a higher intensity corresponds to a higher level of liquid metal 350.

Furthermore, the controller 380 may be configured to estimate the filling rate of the liquid metal 350 in the casting mould based on the rise of the indicated intensity of the detected secondary magnetic field of one of the plurality of eddy current probe assemblies 310, 320, 330.

Figure 3B:
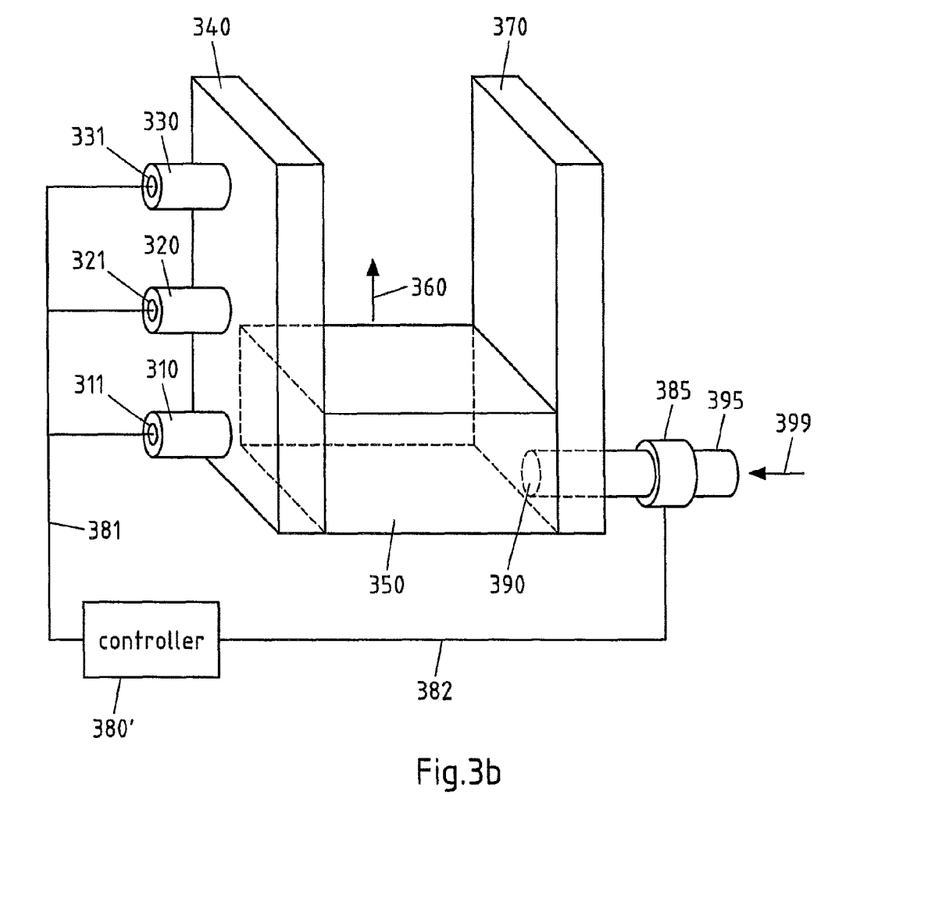
FIG. 3b depicts a second exemplary embodiment of a system according to the present invention.

FIG. 3*b* depicts a third exemplary embodiment of a system according to the present invention. This system is based on the second exemplary embodiment of a system according to the present invention. This third exemplary embodiment of a system according to the present invention will be explained in conjunction with the second exemplary method according to the present invention depicted in FIG. 4*a*. The second exemplary method is based on the first exemplary method illustrated in FIG. 2.

The system comprises means for providing liquid metal 395, wherein liquid metal can be inputted to the means for providing liquid metal 395, as indicate by arrow 399, and wherein the liquid metal can be provided to the casting mould by means of outlet 390. For instance, the means for providing liquid metal 395 may be a pipe for providing liquid metal. The means for providing liquid metal 395 may be arranged at any suited position with respect to the casting mould to be filled. For instance, the means for providing liquid metal 395 may be positioned beneath the casting mould, or, the means for providing liquid metal 395 may be arranged such that outlet 390 of the means for providing liquid metal 395 is placed at a lower position in the casting mould.

The third exemplary embodiment of a system further comprises means for flow control 385 of liquid metal. This means for flow control 385 are arranged at the means for providing liquid metal 395 and are configured to adjust the filling rate of liquid metal based on detected metal by means of controlling flow of liquid metal through the means for providing liquid metal 395. For instance, the means for flow control 385 may represent a valve.

Adjusting the filling rate of the liquid metal based on detected metal in the casting mould has to be understood in the sense that the filling rate is adjusted based on at least one signal provided by the plurality of eddy current probe assemblies 310, 320, 330, since each of this at least one signal is indicative of a secondary magnetic field detected by the respective eddy current probe assembly 310, 320, 330 and thus is indicative of detected metal in a respective predefined region in the casting mould associated with this eddy current probe assembly.

Figure 4A:
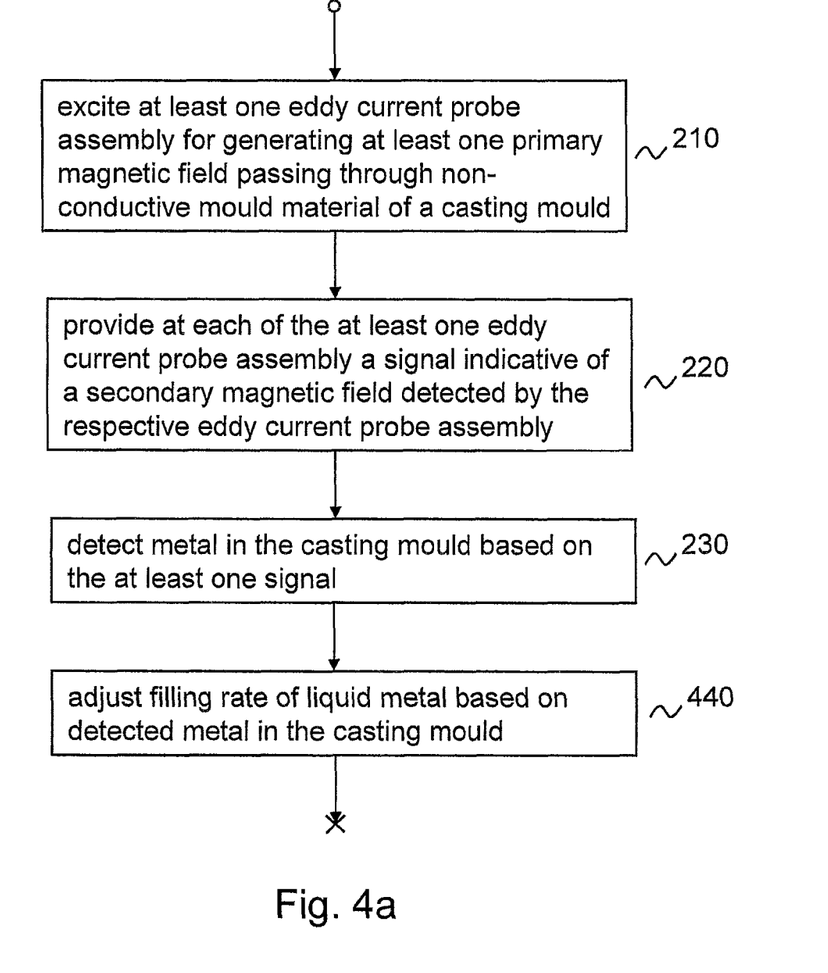
FIG. 4a depicts a flowchart of a second exemplary method according to the present invention.

The means for flow control 385 are connected with controller 380' via signal line 382. The controller 380' is based on controller 380 depicted in FIG. 3*a* and is configured to detect metal based on the at least one signal received from the at least one of the plurality of eddy current probe assemblies 310, 320, 330, as indicated by step 230 in FIG. 4, and the controller 380' is configured to adjusting the filling rate of liquid metal, as indicated by step 440 in FIG. 4, by means of controlling the means for flow control 385. After adjusting the filling rate, the method may proceed with step 210 so as to excite at least one eddy current probe assembly 310, 320, 330.

For instance, the controller 380' may be configured to estimate the level of liquid metal 350 in the casting mould based on at least one signal 311, 321, 331 provided by at least one of the plurality eddy current probe assemblies 310, 320, 330 as explained with respect to the second exemplary system depicted in FIG. 3*a*. Furthermore, the controller 380' may be configured to adjust the filling rate of the liquid metal by means of controlling the means of flow control 385 based on the estimated level of liquid metal 350. Thus, localized feedback on the level of liquid metal 350 in the casting mould can be used for adjusting the filling rate.

Adjusting the filling rate may comprise adjusting the rate of flow of liquid metal through the means for providing liquid metal 395 and/or it may comprise closing the means of flow control 395 in order to stop filling the casting mould.

Figure 4B:
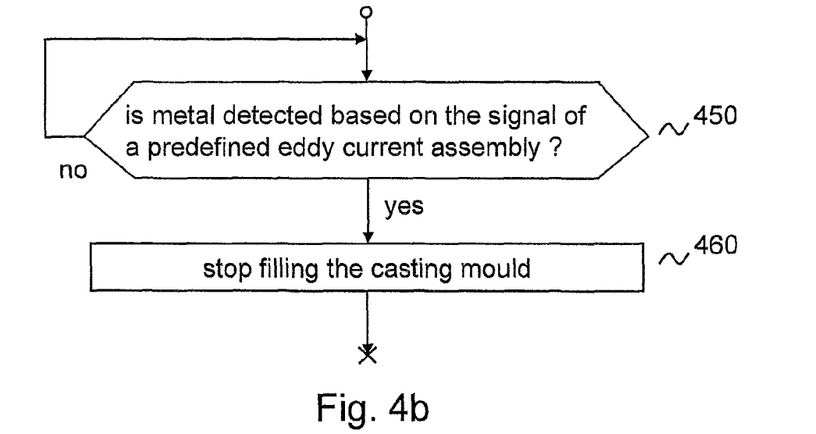
FIG. 4b depicts a flowchart of a third exemplary method according to the present invention.

FIG. 4b depicts a third exemplary embodiment of method according to the present invention.

In step 450, it is determined whether metal is detected based on the signal of a predefined eddy current assembly 310, 320, 330. E.g., with respect to FIG. 3b, this predefined eddy current assembly may be eddy current assembly 330.

In case metal is detected based on the signal of the predefined eddy current assembly 330, the controller 380' stops filling the casting mould as indicated by step 460. Otherwise, the filling rate of liquid metal may be kept unchanged.

Figure 4C:
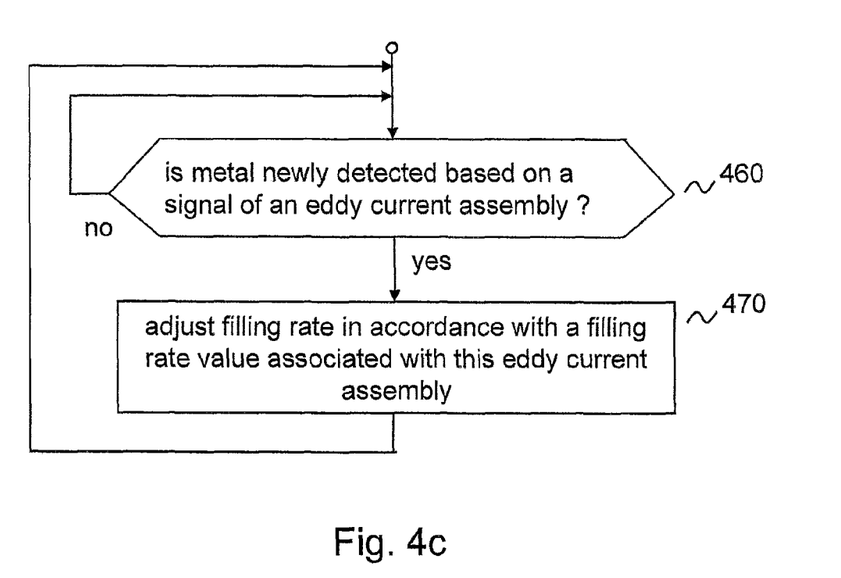
FIG. 4c depicts a flowchart of a fourth exemplary method according to the present invention.

FIG. 4c depicts a fourth exemplary embodiment of method according to the present invention.

For instance, each eddy current probe assembly of at least one of the plurality of eddy current probe assemblies 310, 320, 330 may be associated with a respective filling rate value of liquid metal, i.e. the predefined region of an eddy current probe assembly is associated with the respective filling rate value.

Upon detection that liquid metal has newly reached one of the predefined regions, i.e., when metal is newly detected based on the signal of the eddy current assembly associated with the predefined region, as indicated by step 460 in FIG. 4c, the controller 380' may be configured to adjust the rate of flow of liquid metal in accordance with the filling rate value associated with this eddy current assembly in accordance with step 470 depicted in FIG. 4c.

The term "newly detected" has to be understood in sense that a signal indicative of a detected secondary magnetic field in a predefined region changes from indicating that no metal is detected to indicating that metal is detected.

For instance, in case an eddy current probe assembly 310, 320, 330 is configured to set the signal to the first or second representation, metal is newly detected when this signal changes from the first representation to the second representation.

Or, for instance, in case an eddy current probe assembly 310, 320, 330 is configured to provide the signal in a representation indicative of the intensity of the secondary magnetic field, metal is newly detected in case the intensity indicated by this signal changes from a intensity less a predefined intensity threshold to an intensity greater than this predefined intensity threshold. This threshold may be chosen in accordance with a predefined level of liquid metal with respect to the predefined region associated with this eddy current probe assembly. Furthermore, as another example, the filling rate of liquid metal may be continuously adjusted based on the intensity of the detected secondary magnetic field.

Accordingly, adjusting the filling rate can be performed with respect to several predefined regions in the casting mould, thereby enhancing the quality of casting process due to the possibility of applying adapted filling rates in accordance with the requirements of special regions in the casting mould.

Figure 5:
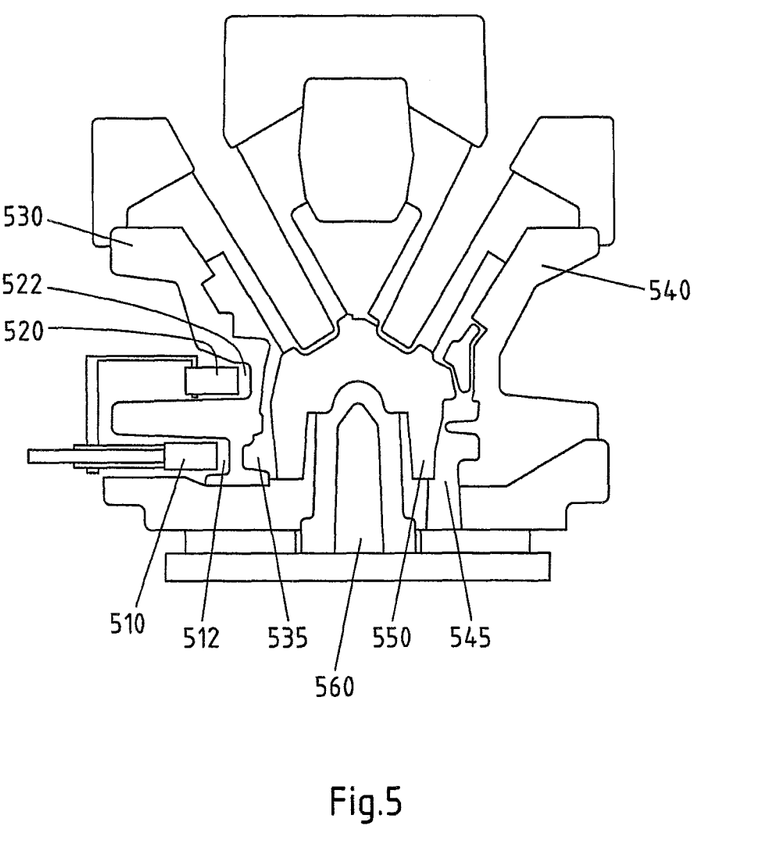
FIG. 5 depicts a third exemplary embodiment of a system according to the present invention.

FIG. 5 depicts a third exemplary embodiment of a system according to the present invention.

This system comprises a first eddy current probe assembly 510 and a second eddy current probe assembly 520 which are configured to be used for detecting metal in a casting mould. The casting mould comprises several mould elements 530, 540, 550 defining several inner areas 535, 545 to be filled with liquid metal during the casting process.

Mould element 530 is formed of non-conductive mold material, at least in positions adjacent to the eddy current probe assemblies 510, 520. For instance, the mould element 530 may comprise recesses, wherein each of the recesses is configured receive a respective eddy current probe assembly 510, 520. Furthermore, the eddy current probe assemblies 510, 520 may be arranged at a predefined distance to the respective non-conductive mold material. Thus, each of the eddy current probe assemblies 51, 520 can be used to generate a primary magnetic field passing through an air gap 512, 522 and the respective non-conductive mold material of mould element 530 towards inner area 535 of the casting mould in order to provide a signal indicative of a secondary magnetic field caused by eddy currents induced in the metal in the inner area 535.

This has the advantage of reliable detecting liquid metal due to the usage of local eddy current probe assemblies 510, 520 which are not sensitive to the electrical contact of liquid metal and/or to other conductors, like cylinder bore liners or metallic chilling elements 560.

The features of the present invention and of its exemplary embodiments as presented above shall also be understood to be disclosed in all possible combinations with each other.

The invention claimed is:

1. A method for detecting metal in an inner region of a casting mould during a casting process, the casting mould comprising several mould elements defining several inner regions to be filled with liquid metal during the casting process, the method comprising providing a plurality of eddy current probe assemblies positioned outside the inner region of the casting mould wherein each of the plurality of eddy current probe assemblies is arranged at a predefined position with respect to the respective non-conductive mould material of the casting mould so as to detect metal in a predefined region of the casting mould;

exciting at least one eddy current probe assembly of the plurality of eddy current probe assemblies such that the at least one eddy current probe assembly generates a primary magnetic field passing through non-conductive mould material of the casting mould to the inner region of the casting mould;

providing at each of the at least one eddy current probe assembly a signal indicative of a secondary magnetic field detected by the respective eddy current probe assembly, the secondary magnetic field caused by eddy currents induced in the metal in the inner region;

detecting metal in the casting mould based on said at least one signal, wherein the metal represents liquid metal, and adjusting the filling rate of the liquid metal based on the detected metal in the casting mould, wherein the step of adjusting the filling rate comprises adjusting the filling rate in accordance with a filling rate value associated with a predefined eddy current probe assembly when metal is newly detected based on the signal of this predefined eddy current probe assembly, wherein each of the predefined regions of one of the plurality of eddy current probe assemblies is associated with a respective filling rate value of liquid metal, and wherein a mould element of the several mould elements is formed of non-conductive mould material and comprises recesses, each of the recesses being configured to receive a respective eddy current probe assembly of the plurality of eddy current probe assemblies.

2. The method according to claim 1, wherein at least one of the plurality of eddy current probe assemblies is configured to set the respective signal to a first representation in case no secondary magnetic field is detected at the respective eddy current probe assembly and to set the respective signal to a second representation in case a secondary magnetic field is detected at the respective eddy current probe assembly.

3. The method according to claim 1, wherein at least one of the plurality of eddy current probe assemblies is configured to provide the respective signal in a representation indicative of the intensity of the secondary magnetic field detected at the respective eddy current probe assembly.

4. The method according to claim 1, wherein the step of adjusting the filling rate comprises:
stopping filling of the casting mould when metal is detected based on the signal of a predefined eddy current probe assembly.

5. The method according to claim 1, wherein at least one of the plurality of eddy current probe assemblies is arranged at a predefined distance from the respective non-conductive mould material.

6. A system for detecting metal in an inner region of a casting mould during a casting process, the casting mould comprising several mould elements defining several inner regions to be filled with liquid metal during the casting process, the system comprising a plurality of eddy current probe assemblies positioned outside the inner region of the casting mould, each of the plurality of eddy current probe assemblies arranged at a predefined position with respect to the respective non-conductive mould material of the casting mould so as to detect metal in a predefined region of the casting mould, and each of the plurality of eddy current probe assemblies configured to generate a primary magnetic field passing through non-conductive mould material of the casting mould to the inner region of the casting mould and to provide a signal indicative of a detected secondary magnetic field caused by eddy currents induced in metal in the inner region; and a controller configured to
excite at least one eddy current probe assembly of the plurality of eddy current probes such that each of the at least one eddy current probe assembly generates the primary magnetic field and to
detect metal in the casting mould based on the at least one signal provided by the at least one eddy current probe assembly, wherein the metal represents liquid metal, and to
adjust the filling rate of the liquid metal based on the detected metal in the casting mould, wherein the step of adjusting the filling rate comprises adjusting the filling rate in accordance with a filling rate value associated with a predefined eddy current probe assembly when metal is newly detected based on the signal of this predefined eddy current probe assembly, wherein each of the predefined regions of one of the plurality of eddy current probe assemblies is associated with a respective filling rate value of liquid metal, and wherein a mould element of the several mould elements is formed of non-conductive mould material and comprises recesses, each of the recesses being configured to receive a respective eddy current probe assembly of the plurality of eddy current probe assemblies.

7. The system according to claim 6, wherein at least one of the plurality of eddy current probe assemblies is configured to set the respective signal to a first representation in case no secondary magnetic field is detected at the respective eddy current probe assembly and to set the respective signal to a second representation in case a secondary magnetic field is detected at the respective eddy current probe assembly.

8. The system according to claim 6, wherein at least one of the plurality of eddy current probe assemblies is configured to provide the respective signal in a representation indicative of the intensity of the secondary magnetic field detected at the respective eddy current probe assembly.

9. The system according to claim 6, wherein the controller is configured to perform adjusting the filling rate based on:
stopping filling of the casting mould when metal is detected based on the signal of a predefined eddy current probe assembly.

10. The system according to claim 6, wherein at least one of the plurality of eddy current probe assemblies is arranged at a predefined distance from the respective non-conductive mould material.

11. A method of using a plurality of eddy current probe assemblies for detecting metal in an inner region of a casting mould during a casting process, the casting mould comprising several mould elements defining several inner regions to be filled with liquid metal during the casting process, the method comprising arranging each of the plurality of eddy current probe assemblies at a predefined position with respect to the respective non-conductive mould material of the casting mould so as to detect metal in a predefined region of the casting mould; providing a mould element of the several mould elements formed of non-conductive mould material and comprising recesses, wherein each of the recesses is configured to receive a respective eddy current probe assembly of the plurality of eddy current probe assemblies; configuring each of the plurality of eddy current probe assemblies to generate a primary magnetic field passing through non-conductive mould material of the casting mould to the inner region of the casting mould and to provide a signal indicative of a detected secondary magnetic field caused by eddy currents induced in metal; and adjusting the filling rate of the liquid metal based on the detected metal in the casting mould, wherein said adjusting the filling rate is based on adjusting the filling rate in accordance with a filling rate value associated with a predefined eddy current probe assembly when metal is newly detected based on the signal of this predefined eddy current probe assembly, wherein each of the predefined regions of one of the plurality of eddy current probe assemblies is associated with a respective filling rate value of liquid metal.

* * * * *